United States Patent Office 3,317,507
Patented May 2, 1967

3,317,507
COPPER-CONTAINING POLYAZO DYESTUFFS
Karl-Heinz Schundehutte, Fritz Suckfull, and Horst Nickel, all of Leverkusen, Germany, assignors to Farbenfabriken Bayer Aktiengesellschaft, Leverkusen, Germany, a corporation of Germany
No Drawing. Filed Nov. 19, 1964, Ser. No. 412,328
Claims priority, application Germany, Nov. 27, 1963, F 41,386
8 Claims. (Cl. 260—145)

The invention relates to new azo dyestuffs which correspond to the general formula

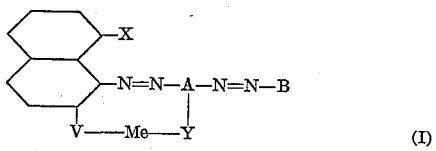
(I)

In this formula A denotes an aromatic radical in which Y is in o-position to the left hand azo group, Y and V are metal complex-bound substituents, X is a hydroxy, acyloxy or acylamino group; Me is a complex-bound metal and B is an organic radical; A, B and the left hand naphthalene radical can possess further substituents such as lower alkyl, like —CH$_3$, —C$_2$H$_5$ or —C$_3$H$_7$, lower alkoxy, e.g. CH$_3$O— or C$_2$H$_5$O—, halogen, e.g. Cl— or Br—, NO$_2$, SO$_3$H, COOH, as well as further azo groups.

The new dyestuffs may be produced in various ways. They are obtained, for example, when, in azo compounds of the general formula

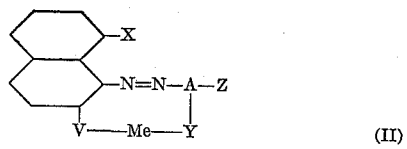
(II)

wherein A, X, Y, V and Me have the meaning stated above and Z is a nitro, diazonium or amino group, Z is converted in conventional manner into an azo grouping. Azo compounds of the Formula II can be produced according to the instructions given in U.S. patent application Serial No. 239,761, filed Nov. 23, 1962, by coupling a diazotised peri-aminonaphthol, preferably in the form of the O-acyl compounds, with an aminophenol, aminonaphthol, or according to the instructions of German patent specification No. 1,085,988 with a nitronaphthol component followed by metallisation of the compound obtained. They can also be formed by coupling acyl-amino- or nitro group-substituted diazonium compounds of the benzene or naphthalene series with a 2,8-dihy-droxynaphthalene, a 2-hydroxy-8-acylamino or a 2-amino-8-hydroxynaphthalene compound, if desired after suitable conversion reactions.

The conversion of the substituent Z into an azo grouping takes place according to known processes. If Z represents a nitro group, compounds of the Formula I can be obtained by treating those compounds of the Formula II wherein Z is NO$_2$ with suitable reducing agents such as glucose in alkaline reaction media, possibly in the presence of other nitro components. The condensation of the nitro compounds with nuclear substituted and/or N-mono-substituted amines of the benzene, naphthalene or stilbene series also leads to azo compounds of the Formula I, as does the condensation of nitro compounds of the benzene, naphthalene or stilbene series with compounds of the Formula II in which Z stands for an amino group.

If Z in compounds of the Formula II stands for a diazonium group, this can be converted into an azo group by coupling with an azo component. Suitable coupling components for this purpose are for example amino-benzene, N-methylaminobenzene, 1-amino-3-methylbenzene, 1-amino-3,5-dimethylbenzene, 1-amino-2,5-dimethylbenzene, 1-amino-2-methoxy-5-methylbenzene, 1-amino-3-methoxybenzene, 1-amino-3-acetaminobenzene, 1,3-diaminobenzene, 3-amino-phenylurea, 1-aminonaphthalene, 1-aminonaphthalene-6-sulphonic acid, 1-aminonaphthalene-7-sulphonic acid, 1-amino-2-ethoxynaphthalene-6-sulphonic acid and 2,5-diaminonaphthalene-4,8-disulphonic acid.

If by suitable choice of condensation or coupling components the dyestuffs of the Formula I contain a primary or secondary amino group, numerous conversion reactions usual in azo dyestuff chemistry may be carried out on this group. Thus two or more mols of the amino diazo compounds of the formula

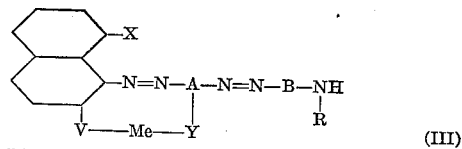
(III)

wherein X, V, Y, Me, A and B have the aforesaid meaning and R stands for hydrogen or a substituent, can be combined with the aid of polyfunctional acylating agents such as phosgene, fumaric acid dichloride, terephthalic acid dichloride or cyanuric chloride, to produce symmetric tetrakisazo dyestuffs of the formula

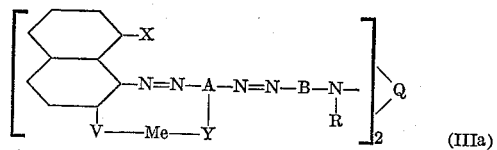
(IIIa)

wherein A, B, V, X, Y, R and Me have the above indicated meaning and Q stands for the residue of a bi- or polyfunctional acylating agent, such as —CO— (from COCl$_2$), —OC—CH=CH—CO— or

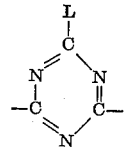

L being Cl or an other organic residue, such as an amino or hydroxy compound; by using cyanuric chloride or chloroformic acid esters, amino disazo dyestuffs of the Formula III can be combined with other aminoazo dyestuffs to form asymmetric polyazo dyestuffs. The dyestuffs thus obtained are especially suitable as direct cotton dyes.

Dyestuffs which belong to the class of reactive dyestuffs, i.e. those which can react with OH— or NH— groups of the fibre with formation of a covalent bond, are obtained, when amino disazo dyestuffs of the Formula III are condensed with acylating agents which carry several reactive groups or several reactive substituents in the molecule, and in such a manner that the final dyestuffs possess at least one reactive grouping. As acylating agents, all reactive components are suitable which are known for the synthesis of reactive dyestuffs, such as di- or tri-halo-sym. triazines, tri- or tetrahalopyrimidines, halo-pyrimidine-carboxylic acids, halopyrimidine-carboxylic acid halides, or -sulphonic acid halides, halofatty acid halides, derivatives of unsaturated aliphatic carboxylic acids, such as haloacrylic acid halides, 2,3-dichloroquinoxaline-6-carboxylic acid halides and -6-sulphonic acid halides, 1,4-dihalophthalazine-6-sulphonic acid halides or -6-carboxylic acid halides, 2-halo-benzthiazole-5-sulphonic acid halides or -5-carboxylic acid halides, the halogen atoms of the preceding compounds being —Br or especially —Cl; and other reactive compounds.

Valuable azo dyestuffs are also obtained when aminodisazo compounds of the Formula III in which R stands for hydrogen, are further diazotised in weakly acidic medium, reacted with a component coupling in the position adjacent to an amino group, and the compounds obtained are triazolised by treatment with an ammoniacal cupric salt solution at an elevated temperature.

In this way, dyestuffs result of the formula

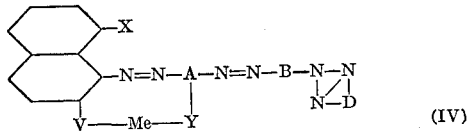
(IV)

wherein V, Y, X, Me, A and B again have the aforesaid meaning and D stands for an aromatic radical, especially one of the naphthalene series, in which the nitrogen atoms of the triazole grouping are in o-position to one another. Amine coupling components

suitable for the synthesis of these dyestuffs are, inter alia, 1-amino-naphthalene-4-sulphonic acid, 2-amino-naphthalene-5-sulphonic acid, 2-aminonaphthalene-6-sulphonic acid, 2-aminonaphthalene-3,6-disulphonic acid. If, instead of the component

a coupling component

containing hydroxyl groups is chosen, in which the diazo group is coupled in a position adjacent to the hydroxyl group the o-hydroxyazo compounds thus obtainable may be metallised according to known processes, for example under the conditions of dealkylating or oxidative coppering; dyestuffs result of the formula

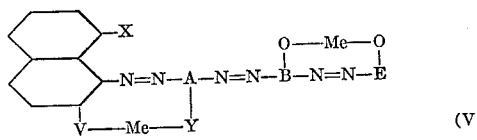
(V)

wherein X, Y, V, Me, A and B have the meaning already given, E represents the radical of an enolic or phenolic coupling component and B and E contain the complex linked hydroxyl groups in the position adjacent to the azo group. Suitable coupling components

are, for example: 1-hydroxy-naphthalene - 4 - sulphonic acid, 1-hydroxynaphthalene-4,8-disulphonic acid, 1-hydroxy-6-benzoylaminonaphthalene - 4,8 - disulphonic acid, 1-hydroxy-6-acetylamino-naphthalene-3-sulphonic acid, 2-hydroxynaphthalene-6-sulphonic acid, 2-hydroxynaphthalene-3,6-disulphonic acid, 2,8-dihydroxynaphthalene-6-sulphonic acid.

More specifically the dyestuffs of the present invention have the general formula:

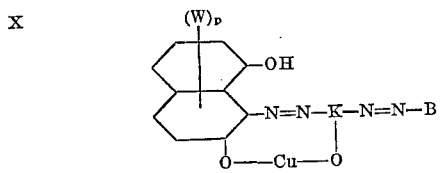

wherein B is an organic radical having the general formulas:

X-A
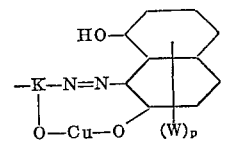

X-B
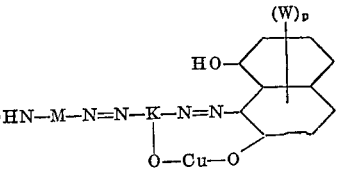

or

X-C
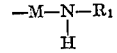

W is a hydrogen or a sulphonic acid radical, $p$ is an integer of 1-3, inclusive, the K-radical is p-phenylene, p-naphthylene, amphi-naphthylene, the sulpho group-substituted radicals thereof or the lower alkyl group-substituted radicals thereof, said —O—Cu—O— bridge being in the ortho position to the azo bridge on the aromatic radicals connected by both the azo bridge and the —O—Cu—O— bridge, M is a member selected from the class consisting of mononuclear and dinuclear aromatic radicals and more preferably a member selected from the class consisting of p-phenylene, lower alkyl-substituted p-phenylene and sulpho-substituted p-phenylene, and $R_1$ is a reactive group obtained by reaction of compounds as set forth hereinabove.

The sequence of individual operations required for carrying out the processes, such as diazotising, coupling, further diazotising, acylating, metallising, triazolising or hydrolysing, can be varied to some extent. Thus, for example, compounds of the Formula I are also obtained when compounds of the formula

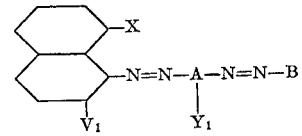
(VI)

wherein X, A and B have the aforesaid meaning, the radical A contains the group $Y_1$ linked in o-position to the left hand azo group, $Y_1$ and $V_1$ stand for substituents which form metal complexes or can be transformed into such groups under the condition of metallisation, are metallised in substance or on the fibre. The same applies to the metallising or metal-free dyestuffs which form the basis of the metal complexes of the Formula V. Also in this case the metal complex forming groups can be metallised at the end of the production process by simple dealkylating, dehalogenating or oxidative coppering or with the aid of other metallising agents according to well-known metallising methods.

The complex-linked metals can also be replaced by other metals at any desired production stage, for example by decoppering a copper complex compound and treating the demetallised compound with nickel salts or iron salts.

A further process for the production of azo dyestuffs of the general Formula I consists in diazotising an optionally further substituted 1-amino-8-hydroxy- or -8-acyloxy- or -8-acylamino-naphthalene compound, which possesses in 2-position a metal complex forming group or a substituent convertible into such a group under the conditions of metallisation, and coupling with an azo compound of the Formula VII

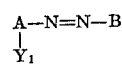
(VII)

capable of coupling in the position adjacent to $Y_1$. In this formula A, B and $Y_1$ have the meanings already given. The intermediate products thus obtained are transformed into metal complex compounds of the Formula I, possibly after further conversion reactions, such as acylation, diazotisation, triazolising.

Suitable coupling components of the Formula VII are for example, compounds coupling in the o-position to the hydroxyl group, which have a 2-arylazo-5-hydroxynaphthalene structure and carry further substituents, especially sulphonic acid groups. Triazole-substituted compounds of this type are, inter alia, obtainable according to U.S. patent application Ser. No. 148,847, filed Oct. 31, 1961, and bifunctional coupling components e.g. by reductive coupling of 6-nitro-1-naphthols or 6-nitro-2-naphthols.

Components of the Formula VII substituted in the radical B by an amino group are obtainable, for example, when a diazotised 2-amino-5-hydroxy-, 2-amino-6-hydroxy- or 1-amino-3-hydroxy-naphthalene component esterified in the hydroxyl group, is coupled with amino compounds of the benzene or naphthalene series coupling in p-position to the amino group and the ester grouping then hydrolysed. Conversion reactions at the amino groups of these coupling products, such as acylations, further diazotising, coupling and triazolising or metallising, or further diazotising and replacement of the diazonium group, can be performed before or after the hydrolysis of the ester grouping or before or after a coupling reaction with diazotised 1-amino-8-hydroxynaphthalene compounds or similar derivatives.

Azo dyestuffs of the general Formula I are also obtained by coupling diazonium compounds of the general formula

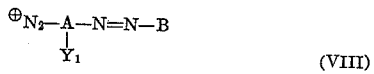

in which A, B and $Y_1$ have the aforesaid meaning, with a 2,8-dihydroxynaphthalene or a 2-hydroxy-8-acyloxy-, 2-hydroxy-8-acylamino- or 2-amino-8-hydroxy-naphthalene compound and transforming the intermediate product obtained, for example of the formula

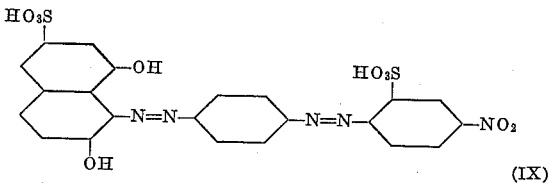

into the copper complex dyestuff of the general Formula I, by known methods, for example by oxidative coppering. Further transformation operations on substituents of B, for example reduction of nitro groups, conversion of a nitro group into the azo grouping etc., can be performed by customary methods, as stated for the other processes.

Among the novel azo dyestuffs of the Formulae I, IIIa, III, IV, V or the azo compounds II, VI, VII and VIII to be used for the preparation of the new dyestuffs those are of particular interest and economical importance in which A and B stand for mono- or dinuclear aromatic residues of the benzene and/or naphthalene series, D stands for a dinuclear aromatic residue of the naphthalene series; the phenolic or enolic coupling components E of Formula V mainly belong to the class of hydroxynaphthalenes or 5-pyrazolones, coupling in adjacent position to OH; V stands for —O—, Y stands for —O—, X stands for OH, O-acyl wherein acyl is the acyl radical of a lower aliphatic carboxylic acid or -sulfonic acid or of a benzene carboxylic acid or -sulfonic acid; or X stands for —NH-acyl wherein acyl has the aforementioned meaning; preferred substituents $V_1$ and $Y_1$ are —OH, H (which is transformed into copper-complex bound hydroxyl groups by means of the oxidative coppering process); the preferred metal atom Me is —Cu—.

If A is a residue of the benzene series the azo groups or the azo group and Z stand preferably in p-position to one another; and if A is a residue of the naphthalene series those dyestuffs or intermediates are of particular importance which possess the azo groups or the azo group and Z in p-position or in amphi (i.e. 2,6-) position to one another. In the residue B the azo groups or the azo and amino (or triazole) groups are preferably located in p-position to each other, in case of a benzene or naphthalene residue, or in amphi position, in case of a naphthalene residue.

The dyestuffs are especially suitable for dyeing vegetabel fibres, such as cotton, and regenerated cellulose. Blue or green dyeings are generally obtained, which are distinguished by very good fastness properties, such as light fastness and fastness to wet processing; the dyeings obtained with the new dyestuffs can easily be discharged and are very fast when after-treated with agents improving the crease-resistance and wet fastness.

The following examples are given for the purpose of illustrating the invention without, however, limiting it thereto.

*Example 1*

86.7 parts by weight (0.1 mol) of the amino azo compound of the formula

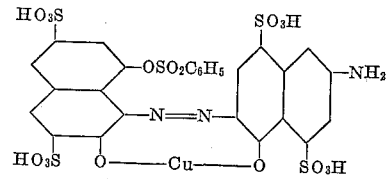

[produced according to the instructions of German patent specification No. 1,117,235 by coupling diazotized 1-amino-8-(benzene sulphonyloxy) - naphthalene - disulphonic acid-(3,6) in a soda-alkaline medium with the equivalent amount of 2-acetylamino - 5 - hydroxynaphthalene - disulphonic acid-(4,8), conversion of the monoazo compound into the copper complex by the method of oxidative coppering and hydrolysis of the acetyl group] are dissolved in 2500 parts by volume of water at 20–25° C. mixed with 200 parts by volume of acetic acid and diazotised by stirring with 24 parts by volume of a 30% sodium nitrite solution. When the diazotisation is completed, the excess nitrite is removed, a solution of 10.7 parts by weight 1-amino-3-methylbenzene in the form of the hydrochloride in 100 parts by volume of water is added, and the coupling is completed by the dropwise addition of 200 parts by volume of a 20% sodium acetate solution.

The coupling product is then separated by addition of 500 parts by weight of sodium chloride and isolated.

The disazo dyestuff thus obtained is dissolved in 2500 parts by volume of water at 40 to 50° C. and treated with phosgene until an amino compound can no longer be detected. During the phosgenation the pH value of the reaction mixture is maintained at 6–7 by sprinkling in sodium carbonate. The separation of the urea group-containing compound is completed by addition of 300 parts by weight of sodium chloride and the tetrakisazodyestuff is then isolated.

The dyestuff paste is dissolved in 2000 parts of water at 85° C., the solution is mixed with 250 parts by volume of 40% sodium hydroxide solution, and stirred until the hydrolysis of the sulphonic acid ester is completed. The mixture is then salted out by adding 250 parts by weight of sodium chloride and isolated. The resultant dyestuff of the formula

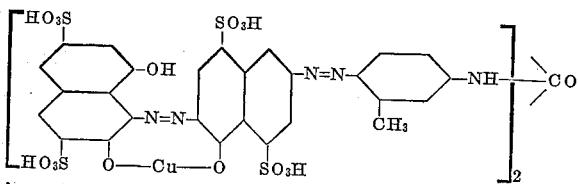

is a dark powder when dried, which dissolves in water with a green colour and dyes cotton in green shades with good fastnesses.

Example 2

78.9 parts (0.1 mol) of the aminoazo compound of the formula

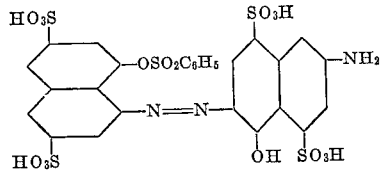

[produced according to the instructions of German patent specification No. 1,117,235 by coupling diazotised 1-amino - 8 - (benzene-sulphonyloxy)-naphthalene-disulphonic acid-(3,6) with the equivalent amount of 2-amino-5-hydroxynaphthalene-4,8-disulphonic acid] are stirred in 200 parts by volume of water, cooled to 0–5° C. by addition of ice, mixed with 35 parts by volume of concentrated hydrochloric acid and diazotised by addition of 28 parts by volume of a 30% sodium nitrite solution.

When the diazotisation is completed, the excess nitrous acid is removed, a hydrochloric acid solution of 12 parts by weight of 1-amino-3-methyl benzene is added and coupling is carried out at pH 3–4 by adding sodium acetate. The amino-disazo dyestuff is isolated after the coupling is completed.

The dyestuff paste is dissolved neutral in 500 parts by volume of water at 25° C. with sodium carbonate, and treated with phosgene until the free amino azo compound can no longer be detected. The solution of the urea group-containing compound thus obtained is brought to a pH of 8.5 by addition of a sodium carbonate solution, mixed with 130 parts by volume of a 20% sodium acetate solution, 130 parts by volume of a 20% copper sulphate solution and oxidatively coppered at 45–50° C. by adding 280 parts by volume of a 3% hydrogen peroxide solution. When the coppering is completed the dyestuff is salted out by addition of 200 parts by weight of sodium chloride and isolated.

The dyestuff paste is stirred at 90–95° C. in 1000 parts by volume of a 3% sodium hydroxide solution for 30 minutes, the reaction mixture is neutralised by addition of 40 parts by volume of glacial acetic acid and the dyestuff isolated at 70° C. The compound thus obtained has the same constitution and the same properties as that obtained according to Example 1.

Dyestuffs with similar dye shades and properties are obtained, when in this example the 1-amino-3-methylbenzene is replaced by equivalent amounts of 1-amino-3,5-dimethylbenzene, 1 - amino-2,5 - dimethylbenzene or 1-amino-2-methoxy-5-methylbenzene. If the 1-amino-3-methylbenzene is replaced by 1-amino-3-acetylaminobenzene or by 3-aminophenylurea, dyestuffs with blue-grey shades and similar fastness properties are obtained.

Example 3

52.3 parts by weight of 5-(O-benzene sulphonyloxy)-2-aminonaphthalene-4,8-disulphonic acid are diazotised as usual, coupled with 11 parts by weight of 1-amino-3-methylbenzene, the aminoazo compound is phosgenated and the sulphonic ester groupings are hydrolysed in the urea group-containing compound by treatment with 3% caustic soda at 85–90° C.

The coupling component thus obtained is coupled in a soda-alkaline medium with the diazonium compound from 0.1 mol 1-amino-8-(benzene-sulphonyloxy)-naphthalene-disulphonic acid-(3,6), the coupling product is oxidatively coppered and hydrolysed as described in Example 2.

The dyestuff obtained corresponds with respect to its constitution and its properties to the compound described in Example 1.

Example 4

52.3 parts by weight of 5-(O-benzene-sulphonyloxy)-2-amino-naphthalene-4,8-disulphonic acid are dissolved in 400 parts by volume of water, cooled with ice to 0–5° C., mixed with 23 parts by volume of a 30% sodium nitrite solution and diazotised by addition of 28 parts by volume of 30% hydrochloric acid. After the diazotisation is completed, a hydrochloric acid solution of 10.7 parts by weight of 1-amino-3-methylbenzene is added and coupling is carried out at pH 3–4 by addition of sodium acetate. The aminoazo compound is isolated after the coupling is completed.

The dyestuff paste obtained is dissolved as the sodium salt in 800 parts by volume of water, mixed with 23 parts by volume of a 30% sodium nitrite solution and then diazotised by rapid addition of 28 parts by volume of 30% hydrochloric acid. The diazonium compound thus obtained is coupled in the usual way at pH 3–4 with an equivalent amount of 2-aminonaphthalene-5-sulphonic acid.

After the coupling is completed, the aminoazo compound is isolated, dissolved in 1000 parts by volume of hot water and mixed with a solution of 56 parts by weight of crystalline copper sulphate in 140 parts by volume of water and 130 parts by volume of a 25% ammonia solution. It is then stirred at 90–95° C. for about 3 hours until the triazolising is completed. The triazole compound is then salted out by addition of 200 parts by weight of sodium chloride and isolated.

The isolated paste of the azo-triazole compound is stirred into 500 parts by volume of water, mixed with 20 parts by volume of a 40% sodium hydroxide solution and the sulphonyloxy group is hydrolysed by heating for one hour at 90–95° C. By salting out with 100 parts by weight of sodium chloride the hydroxy-azo dyestuff of the formula

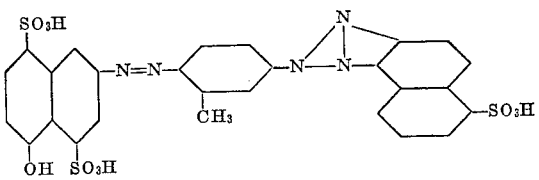

is separated hot, and isolated.

The dyestuff is then dissolved in 500 parts by volume of water with 140 parts by volume of a 20% sodium carbonate solution and coupled with the diazonium compound produced in the usual way from 0.1 mol 1-amino-8 - (benzene-sulphonyloxy)-naphthalene-disulphonic acid-(3,6). The azo dyestuff obtained is converted by the method of oxidative coppering into the copper complex compound and then the sulphonyloxy group is hydrolysed by treatment with a 3% sodium hydroxide solution at about 90° C.

The dyestuff thus obtained of the formula

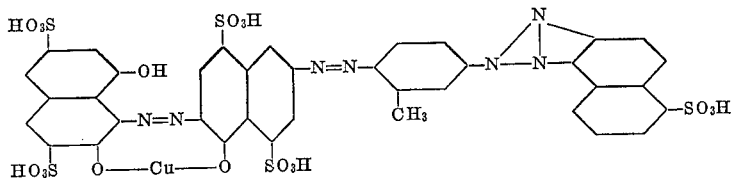

is a dark powder when dried, which dissolves in water with a green colour and dyes cotton in very clear yellowish green shades.

Example 5

The amino-disazo compound obtainable according to the instructions of Example 2 by coupling the diazonium compound from 0.1 mol 1-amino-8-(benzene-sulphonyloxy)-naphthalene-disulphonic acid-(3,6) with the equivalent amount of 2-amino-5-hydroxynaphthalene-4,8-disulphonic acid, further diazotising and coupling with 1-amino-3-methylbenzene, is stirred in 700 parts by volume of water, mixed with 33 parts by volume of concentrated hydrochloric acid and diazotised at 5–10° C. by dropwise addition of 23 parts by volume of a 30% sodium nitrate solution.

After the diazotisation is completed, the precipitate is isolated, stirred with 350 parts by volume of ice water and mixed with a concentrated solution of 0.1 mol 2-aminonaphthalene-5-sulphonic acid. The coupling is completed by dropwise addition of 130 parts by volume of a 20% sodium acetate solution. When coupling is terminated, 280 parts by volume of a 20% sodium acetate solution, and 280 parts by volume of a 20% copper sulphate solution are added, and 530 parts by volume of a 3% hydrogen peroxide solution are added dropwise with stirring at 45–50° C., within 2 hours. When coppering and triazolising is completed, the product is salted out with 500 parts by weight of sodium chloride and isolated. The paste obtained is stirred into 1000 parts by volume of a 3% sodium hydroxide solution for 30 minutes at 90° C. to hydrolyse the sulphonic ester grouping, and the precipitated dyestuff is isolated. The dyestuff obtained corresponds with respect to its constitution and properties to the compound described in Example 4.

Dyestuffs with similar dye shades and fastnesses are obtained, when in this example the 1-amino-3-methyl-benzene is replaced by 1-amino-3,5-dimethylbenzene, 1-amino-2,5-dimethylbenzene, 1-amino-2-methoxy-5-methyl-benzene or aminobenzene, or when 1-aminonaphthalene-4-sulphonic acid, 2-aminonaphthalene-6-sulphonic acid, 2-aminonaphthalene-3,6-disulphonic acid is used as end component instead of 2-aminonaphthalene-5-sulphonic acid.

Example 6

By coupling the diazonium compound from 57.5 parts by weight of 1-amino-8-(benzene-sulphonyloxy)-naphthlene-disulphonic acid-(3,6) with an equivalent amount (0.1 mol) of the hydroxy-azo dyestuff of the formula

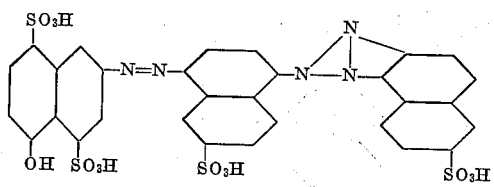

(obtainable by replacement of the 1-amino-3-methylbenzene in Example 4 by 1-aminonaphthalene-6-sulphonic acid), conversion into the copper complex by the method of oxidative coppering and hydrolysis of the sulphonyloxy grouping a dyestuff is obtained which is a dark powder when dried, and dyes cotton in very clear green shades with good fastness properties.

The replacement of the 1-aminonaphthalene-6-sulphonic acid as middle component by 1-aminonaphthalene-7-sulphonic acid or 1-amino-2-ethoxy-naphthalene-6-sulphonic acid, and also the replacement of the 2-aminonaphthalene-6-sulphonic acid as end component by 2-aminonaphthalene-5-sulphonic acid, 1-aminonaphthalene-4-sulphonic acid or 2-aminonaphthalene-3,6-disulphonic acid, leads to dye stuffs which dye cotton in clear green shades with good fastness properties.

Example 7

By coupling the diazonium compound from 0.1 mol of the aminoazo compound of the formula

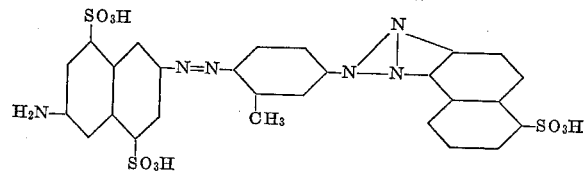

in an acid medium with the equivalent amount of 2-amino-8-hydroxy-naphthalene-3,6-disulphonic acid, conversion of the amino group into a hydroxy group by treatment with sodium nitrite in an acid medium at 30 to 40° C., and transformation of the hydroxyazo compound into the copper complex, a dyestuff is obtained which corresponds with respect to its constitution and properties to the compound obtained according to Example 4.

Example 8

0.1 mol of the copper complex dyestuff of the formula

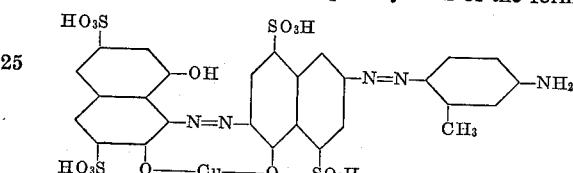

produced according to the instructions of Example 1, is dissolved in 3000 parts by volume of water at pH 6 and combined with a suspension of 18.5 parts by weight (0.1 mol) of cyanuric chloride in ice-water/acetone by stirring at a temperature of about 5° C. The mixture is stirred until the condensation is complete, the dyestuff is separated by adding a little sodium chloride and isolated. The residue is washed with acetone and dried at room temperature under reduced pressure. A dark powder is obtained, which dissolves in water with a green colour.

For the production of a reactive dyeing, 100 parts by weight of a cotton fabric are predyed for 10 minutes with a 2% aqueous solution of the dichlorotriazinylamino group-containing dyestuff obtained according to this example. 50 g./litre of sodium chloride are added portionwise within 20 minutes, and then 5 g./litre of predissolved calcined sodium carbonate are added. The material is dyed for one hour in the cold, rinsed and thoroughly soaped at the boil. The fabric is thus dyed in green shades. The dyeing possesses very good wet- and light-fastness properties.

Example 9

0.1 mol of the hydroxyazo compound of the formula

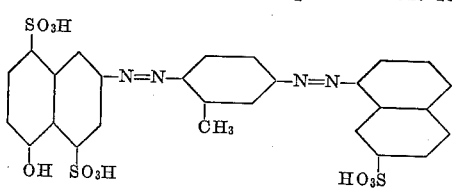

produced by coupling diazotised 2-amino-5-benzene-sulphonyloxy-naphthalene-disulphonic acid-(4,8) with 1-amino-3-methyl benzene, further diazotising the coupling product, coupling again with 1-amino-naphthalene-6-sulphonic acid, diazotising the amino-disazo compound, replacing the diazonium group with hydrogen by treatment with hypophosphorous acid and then hydrolysing the sulphonyloxy group, are dissolved in 1000 parts by volume of water and coupled with the diazonium compound from 57.5 parts by weight of 1-amino-8-(O-benzene-sulphonyloxy)-naphthalene-disulphonic acid-(3,6). The trisazo compound is isolated, dissolved in 1500 parts by volume of water, oxidatively coppered at 40 to 50° C. and then hydrolysed with a sodium hydroxide solution. The dyestuff obtained of the formula

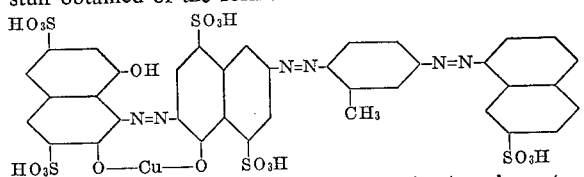

is a dark powder when dried, which dissolves in water with a green colour and dyes cotton in very lightfast green shades.

*Example 10*

0.05 mol of the dihydroxyazo compound of the formula

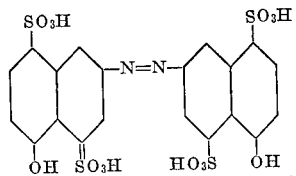

produced by reductive linkage of 2 mol 6-nitro-1-hydroxy-naphthalene-4,8-disulphonic acid by means of glucose, are dissolved as the sodium salt in 1500 parts by volume of water, mixed with 170 parts by volume of a 20% sodium carbonate solution and combined with the diazonium compound obtained in the usual manner from 57.5 parts by weight of 1-amino-8-(O-benzene-sulphonyloxy)-naphthalene-disulphonic acid-(3,6). After the coupling is completed, the trisazo compound is salted out by adding 200 parts by weight of sodium chloride and isolated.

The dyestuff paste is then thoroughly stirred in 400 parts by volume of water at 20° C., mixed with 140 parts by volume of a 20% solution of sodium acetate and 140 parts by volume of a 20% copper sulphate solution and converted within 3 hours into the copper complex by dropwise addition of 100 parts by volume of a 10% hydrogen peroxide solution. After completion of the oxidative coppering, the dyestuff is separated by addition of 100 parts by weight of sodium chloride and 100 parts by weight of potassium chloride and isolated.

The dyestuff paste is stirred in 500 parts by volume of a 5% sodium hydroxide solution at 90° C. for 30 minutes, until the hydrolysis of the sulphonyloxy group is completed.

140 parts by volume of acetic acid are then added and the dyestuff is isolated at 50° C. When dried it is a dark powder, which dissolves in water with a blue-green colour and dyes cotton in extraordinarily light-fast blue green shades.

*Example 11*

The diazonium compound from 57.5 parts by weight 1 - amino - 8 - (O-benzene-sulphonyloxy)-naphthalene-disulphonic acid-(4,6) is coupled in a soda-alkaline medium with 0.1 mol of 6-nitro-1-hydroxynaphthalene-4-sulphonic acid, isolated, dissolved neutral in 1500 parts by volume of water, mixed with 140 parts by volume of a 20% copper sulphate solution and oxidatively coppered at 40° C. within 3 hours by dropwise addition of 100 parts by volume of a 10% hydrogen peroxide solution. The dyestuff is then isolated, the paste obtained is stirred in 1400 parts by volume of water, mixed with 130 parts by volume of a 40% sodium hydroxide solution and 17 parts by weight of glucose dissolved in 60 parts by volume of water. The material is slowly heated to 50° C. and kept at this temperature until the reductive coupling is completed. After cooling to room temperature the dyestuff is separated by adding potassium chloride and isolated. The dyestuff obtained after hydrolysis, of the formula

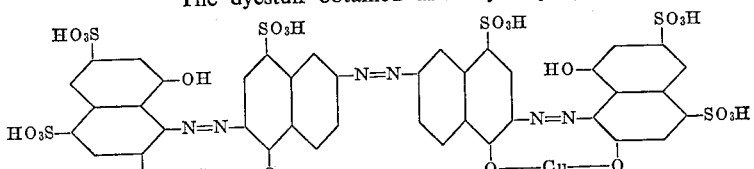

is, when dried, a dark powder, dissolves in water with a blue colour and dyes cotton in greenish blue shades with very good light fastness.

*Example 12*

0.1 mol 2-bromo-1-amino-8-(O-benzene-sulphonyloxy)-naphthalene-disulphonic acid-(4,6) are diazotised as usual and coupled in a weakly acid medium (appr. pH 6) with 2-amino-5-hydroxynaphthalene-disulphonic acid-(4,8). The coupling product is again diazotised and coupled in an acid medium with 1-amino-2-methoxy-5-methylbenzene, isolated, dissolved neutral in 2000 parts by volume of water, mixed with 25 parts by volume of a 30% sodium nitrite solution and diazotised by adding 30 parts by volume of concentrated hydrochloric acid. When the diazotisation is completed, the product is coupled with the equivalent amount of 2-hydroxynaphthalene-disulphonic acid-(3,6) in a weakly alkaline reaction medium, the coupling product is isolated and converted by dealkylating exchange coppering into the copper complex. The dyestuff thus obtained of the formula

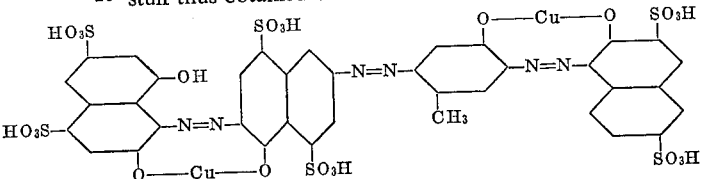

when dried, is a dark powder, which dissolves in water with a blue colour, and dyes cotton in clear blue shades by good light fastness.

We claim:
1. A dyestuff of the formula:

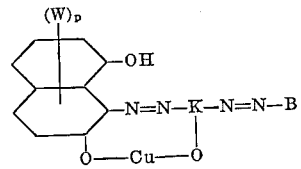

wherein B is

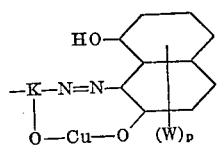

or

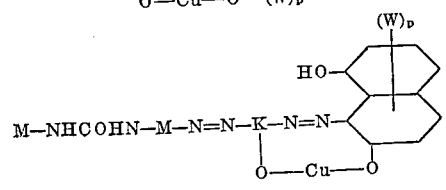

W is a hydrogen or a sulphonic acid radical, $p$ is an integer of 1–3, inclusive, the K-radical is p-phenylene, methyl-substituted p-phenylene, sulpho-substituted p-phenylene, p-naphthylene, sulpho-substituted p-naphthylene, amphi-naphthylene, or sulpho-substituted amphi-naphthylene, said —O—Cu—O— bridge being in the ortho position to the azo bridge on the aromatic radicals connected by both the azo bridge and the —O—Cu—O— bridge, M is p-phenylene, sulpho-substituted p-phenylene, methyl-substituted p-phenylene, sulpho- and methyl-substituted p-phenylene, p-naphthylene, sulpho-substituted p-naphthylene, and $R_1$ is halo-sym. triazinyl, halo-pyrimidinyl, halo-pyrimidine-carbonyl, halo-pyrimidine-sulphonyl, 2,3-dihalo-quinoxaline-6-carbonyl, 2,3-dihalo-quinoxaline-6-sulphonyl, 1,4-dihalo-phthalazine-6-sulphonyl, 1,4-dihalo-phthalazine-6-carbonyl, 2-halo-benzthiazole-5-sulphonyl, 2-halo-benzthiazole-5-carbonyl, halo-acryloyl, halo-acetyl, or halo-propionyl, wherein halo is chloro or bromo.

2. The dyestuff of claim 1 having the formula:

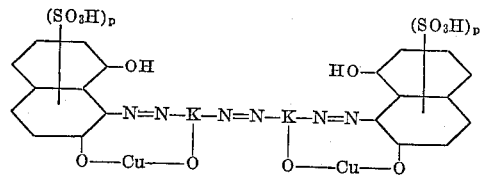

wherein $p$ and K are as defined in claim 1.

3. The dyestuff of claim 1 having the formula:

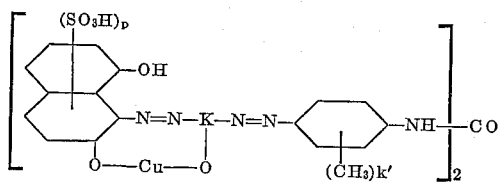

wherein K and $p$ are as defined in claim 1 and $k'$ is an integer from 0 to 2.

4. The dyestuff of the formula

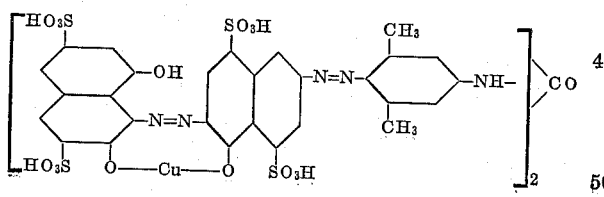

5. The dyestuff of the formula

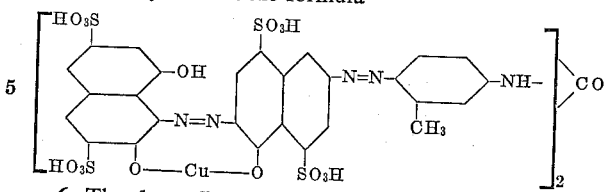

6. The dyestuff of the formula

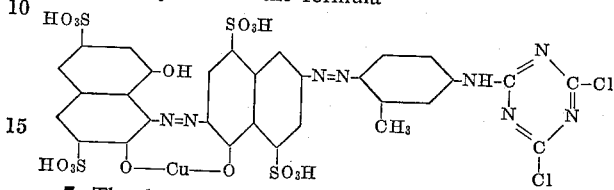

7. The dystuff of the formula

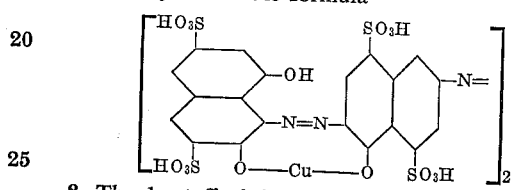

8. The dyestuff of the formula

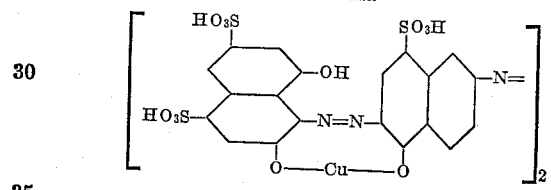

References Cited by the Examiner

UNITED STATES PATENTS

| | | | |
|---|---|---|---|
| 2,175,522 | 10/1939 | Schindhelm et al. | 260—146 |
| 2,212,816 | 8/1940 | Schultis et al. | 260—146 |
| 2,736,724 | 2/1956 | Maderni | 260—148 X |

FOREIGN PATENTS

| | | |
|---|---|---|
| 472,787 | 4/1951 | Canada. |
| 549,637 | 12/1957 | Canada. |
| 771,330 | 3/1957 | Great Britain. |
| 786,918 | 11/1957 | Great Britain. |
| 1,342,510 | 9/1963 | France. |

CHARLES B. PARKER, *Primary Examiner.*

FLOYD D. HIGEL, *Assistant Examiner.*